(12) United States Patent
Li et al.

(10) Patent No.: US 8,049,380 B2
(45) Date of Patent: Nov. 1, 2011

(54) ELECTRIC MOTOR

(75) Inventors: Wen Liang Li, Shenzhen (CN); Ji Dong Chai, Shenzhen (CN); Bao Ting Liu, Shenzhen (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 219 days.

(21) Appl. No.: 12/535,259

(22) Filed: Aug. 4, 2009

(65) Prior Publication Data
US 2010/0026112 A1   Feb. 4, 2010

(30) Foreign Application Priority Data

Aug. 4, 2008  (CN) .......................... 2008 1 0142775

(51) Int. Cl.
*H02K 9/00* (2006.01)
*H02K 13/00* (2006.01)
(52) U.S. Cl. ........... 310/62; 310/227; 310/239; 310/242
(58) Field of Classification Search ............... 310/62, 310/227, 239, 242
See application file for complete search history.

(56) References Cited

U.S. PATENT DOCUMENTS

| 1,492,931 | A | * | 5/1924 | Nobuhara | 310/227 |
|---|---|---|---|---|---|
| 2,057,637 | A | * | 10/1936 | Schneider | 310/52 |
| 2,460,752 | A | * | 2/1949 | Jacobsen | 310/57 |
| 2,628,320 | A | * | 2/1953 | Humphrey | 310/62 |
| 2,989,995 | A | * | 6/1961 | Happe | 30/391 |
| 3,073,976 | A | * | 1/1963 | Wesolowski | 310/59 |
| 3,085,603 | A | * | 4/1963 | Stanley | 30/392 |
| 3,749,953 | A | * | 7/1973 | Baumann et al. | 310/62 |
| 4,142,120 | A | * | 2/1979 | Hallerback | 310/59 |
| 4,293,788 | A | * | 10/1981 | Binder | 310/227 |
| 4,492,885 | A | * | 1/1985 | Kitamura et al. | 310/62 |
| 4,680,493 | A | * | 7/1987 | Ziegler et al. | 310/62 |
| 4,908,538 | A | * | 3/1990 | Geberth, Jr. | 310/59 |
| 6,011,331 | A | * | 1/2000 | Gierer et al. | 310/58 |
| 6,031,306 | A | * | 2/2000 | Permuy | 310/67 R |
| 6,144,121 | A | * | 11/2000 | Ishida et al. | 310/50 |
| 6,586,853 | B2 | * | 7/2003 | Ishida et al. | 310/62 |
| 6,977,452 | B2 | * | 12/2005 | Ibach | 310/62 |

(Continued)

FOREIGN PATENT DOCUMENTS

EP          556416 A1  *  8/1993

(Continued)

*Primary Examiner* — Quyen Leung
*Assistant Examiner* — Alex W Mok
(74) *Attorney, Agent, or Firm* — Muncy, Geissler, Olds & Lowe, PLLC

(57) ABSTRACT

An electric motor has a stator and a rotor. The stator has a housing with inlets and outlets. The rotor has a shaft, a rotor core and a commutator. A fan is fixed to the rotor. An end cap is fitted to the housing to close a first end of the housing and support electrical components, including brush gear. The brush gear includes two brush assemblies, each comprising a brush for making sliding electrical contact with the commutator and a brush guidance mechanism for resiliently urging the brush into contact with the commutator. The brush assemblies are accommodated in compartments of the end cap. Each compartment has vents on an axially facing side thereof and openings in a transverse wall thereof. An air guide guides a part of the airflow generated by the fan exiting from at least one of the outlets of the housing to flow into the compartments via the openings and exit the compartments via the vents to cool the brushes.

7 Claims, 3 Drawing Sheets

U.S. PATENT DOCUMENTS

| | | | |
|---|---|---|---|
| 7,804,208 B2 * | 9/2010 | Hui | 310/57 |
| 2005/0134126 A1 * | 6/2005 | Ibach | 310/62 |

FOREIGN PATENT DOCUMENTS

| | | | | |
|---|---|---|---|---|
| JP | 01198242 | A | * | 8/1989 |
| JP | 02246752 | A | * | 10/1990 |
| JP | 10073096 | A | * | 3/1998 |
| JP | 2000139058 | A | * | 5/2000 |
| JP | 2002247808 | A | * | 8/2002 |
| JP | 2003102148 | A | * | 4/2003 |
| JP | 2004297891 | A | * | 10/2004 |
| JP | 2007202253 | A | * | 8/2007 |

* cited by examiner

ELECTRIC MOTOR

CROSS REFERENCE TO RELATED APPLICATIONS

This non-provisional patent application claims priority under 35 U.S.C. §119(a) from Patent Application No. 200810142775.7 filed in The People's Republic of China on Aug. 4, 2008.

FIELD OF THE INVENTION

The present invention relates to electric motors and in particular to cooling of brushes in a mechanically commutated motor.

BACKGROUND OF THE INVENTION

A mechanically commutated motor has a wound rotor and a commutator which provides power to the rotor winding by brushes which make sliding electrical contact with the commutator. Heat is generated within the motor by the electric current flowing through the windings, through magnetic eddy currents in the steel of the rotor core, by friction between the brushes and the commutator, electrical erosion or sparking between the commutator and the brushes and by direct heating of the brushes by the current passing through each brush. This heat needs to be dissipated or removed from the motor or risk serious damage to the motor. Usually, a fan removes this heat by inducing a flow of air drawn into the motor housing and across the commutator or across the rotor core and windings. However, the brushes are not specifically cooled and under heavy load conditions the brushes may heat up sufficiently to reduce the working life of the brushes. This is especially a problem for guided brushes, such as those used with brush cages and even for rail guided brushes as the cage and/or end cap or brush card to which the brush guiding system is fitted restricts air flow about the brush, even in a relatively open brush gear arrangement.

As such, there is a desired for an improved electric motor which can solve the above-mentioned problem or at least provide a useful alternative.

SUMMARY OF THE INVENTION

Accordingly, in one aspect thereof, the present invention provides an electric motor comprising: a stator comprising a housing with inlets and outlets; a rotor rotatably installed in the housing of the stator, the rotor comprising a shaft, a rotor core fitted to the shaft, and a commutator fitted to the shaft adjacent the rotor core; a fan fixed to the rotor for rotation there with; an end cap fitted to the housing and closing a first end of the housing and supporting electrical components; brush gear, supported by the end cap, comprising at least two brush assemblies, each brush assembly comprising a brush for making sliding electrical contact with the commutator and a brush guidance mechanism for resiliently urging the brush into contact with the commutator; and an air guide; wherein the end cap has compartments accommodating the brush assemblies, each compartment having vents on an axially facing side thereof and openings in a transverse wall thereof and the air guide guides a part of the airflow generated by the fan exiting from said one of the outlets of the housing to flow into the compartments via the openings and exit the compartments via the vents to cool the brushes therein.

Preferably, the housing has a closed end and at least one of the inlets are formed in the closed end of the housing and the fan draws air in through said at least one inlet and over the rotor core.

Preferably, the end cap has two compartments, each accommodating a single brush assembly and the air guide comprises a pair of covers fitted to a radially outer surface of the end cap.

Preferably, each compartment has two transverse walls with an opening therein and each cover extends over one opening of each compartment and one of the outlets of the housing.

Preferably, each cover forms an air passage between the one outlet and the two openings and air flow through the one outlet is divided between the two openings.

Preferably, each compartment extends radially through and beyond a wall of the housing and has an axially open face which is disposed adjacent a second one of the outlets, said second one of the outlets being uncovered by the air guide and air exhausting from said second one of the outlets being free to impinge on the brush assembly within the adjacent compartment.

Preferably, each brush guidance mechanism comprises a rail arrangement for guiding movement of the brush, a spring for resiliently biasing the brush toward the commutator, and a brush card for securing the rail arrangement to the end cap.

Preferably, the brush has a pair of grooves and the rail arrangement comprises a pair of rails respectively received in the grooves.

Preferably, the pair of rails comprise opposite ends of a single bent rod fixed to the brush card.

Preferably, the housing has slots formed in the open end and joining with the second outlets for receiving the compartments of the end cap.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DESCRIPTION OF THE PREFERRED EMBODIMENT

Figure 1:
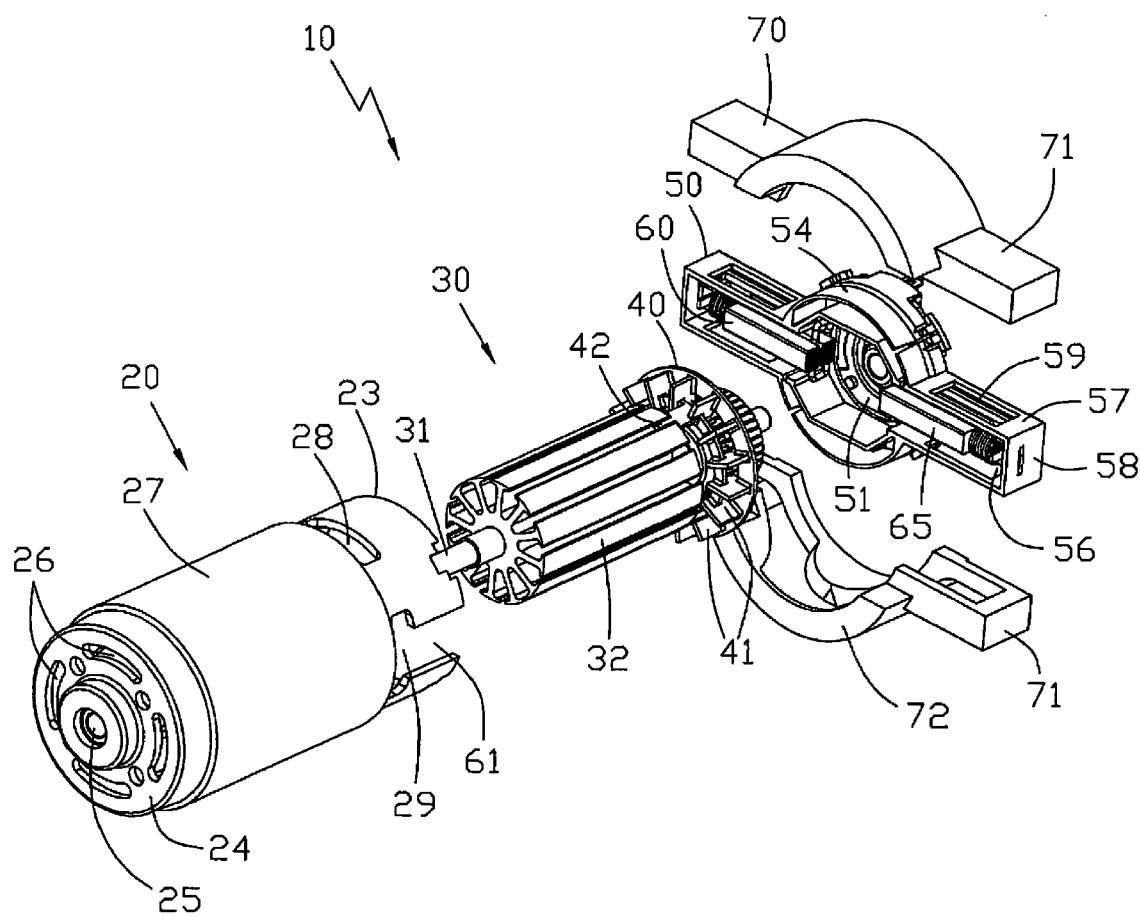
FIG. 1 is an exploded view of an electric motor in accordance with an embodiment of the present invention.
Figure 2:
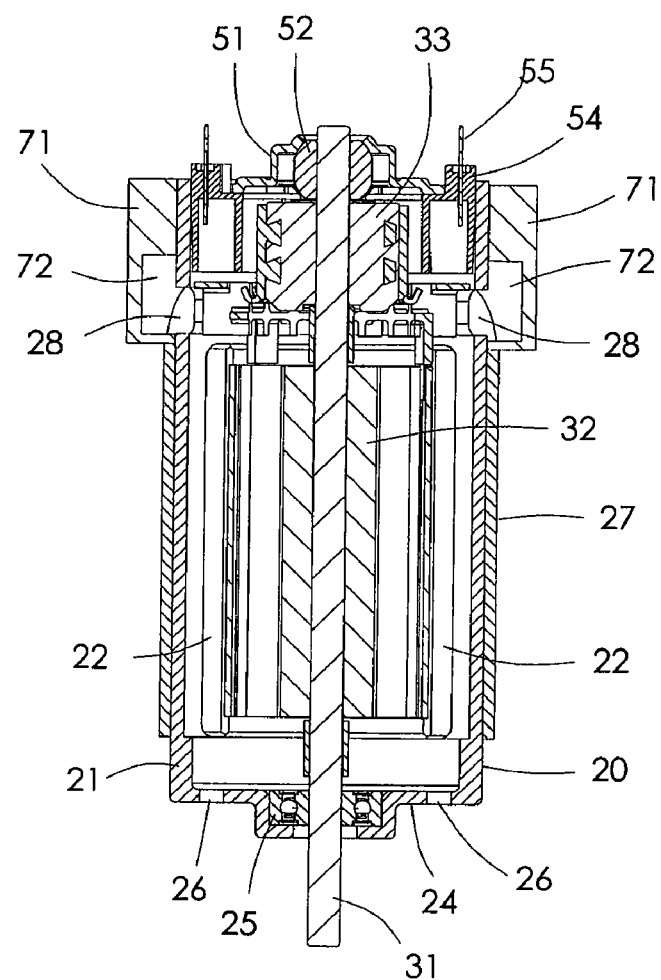
FIG. 2 is a cross-sectional view of the assembled motor of FIG. 1.
Figure 3:
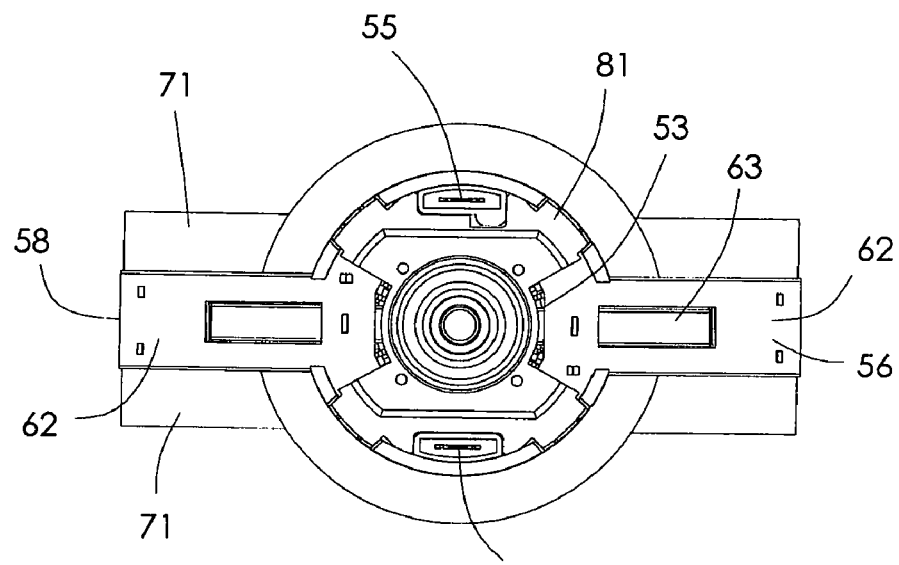
FIG. 3 is a plan view of the motor of FIG. 1.
Figure 4:
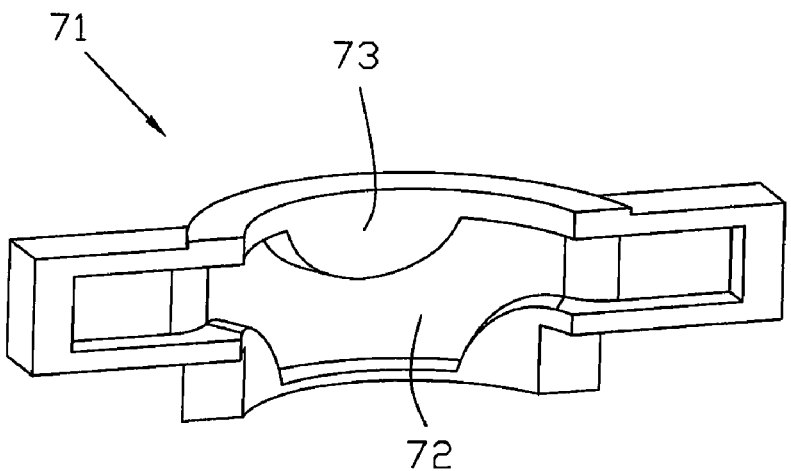
FIG. 4 is a perspective view of a part of an air guide, being a part of the motor of FIG. 1.

The drawings show a motor 10 with a cooling system in accordance with the preferred embodiment of the present invention. The motor 10 comprises a stator 20, a rotor 30 rotatably installed in the stator 20, a fan 40 fixed to the rotor for rotation there with, an end cap 50 supporting brush gear 60, and an air guide 70. The motor illustrated is a miniature permanent magnet DC motor.

The stator 20 comprises a housing 21 and permanent magnets 22 fitted to the inside of the housing 21. The housing 21 is a deep drawn cylindrical housing having an open end 23 and a closed end 24. The closed end 24 has a bearing 25 and a number of inlets 26 in the form of through holes or windows. A flux ring 27 is shown provided on the outer surface of the housing. Adjacent the open end 23 are a number of outlets. Shown are two first outlets 28 and two second outlets 29. Slots 61 open the second outlets 29 to the open end of the housing.

The rotor 30 has a shaft 31 on which is fitted a rotor core 32 and a commutator 33. Windings (not shown) are wound about teeth or poles of the rotor core and terminated on terminals of the commutator 33. A fan 40 is fitted to the rotor 30 for rotation therewith. As shown, the fan has a plurality of blades 41 for generating air flow when the fan is rotating. The fan has a number of mounting fingers 42 with locate within the small gaps between heads of adjacent rotor poles to fix the fan 40 to the rotor core 32.

The end cap 50 closes the open end 23 of the housing 21. The end cap shown is of a two part structure having a metal part 51 and a plastic part 54. The metal part 51 supports a second bearing 52. The shaft 31 is journalled in bearings 25, 52. The plastic part is electrically non-conductive and supports electrical components of the motor such as the motor terminals 55, the brush gear 60 and electrical noise suppression components, if fitted. The plastic part may be referred to as holder 54. The end cap 50 is fixed to the housing 21 by the holder 54 being stepped and held against the open end 23 by tabs 81 formed on the metal part 51 being crimped to cutouts in the open end 23, as is generally known in the art.

The holder 54 has two compartments 56 which accommodate the brushes. Each compartment 56 has two transverse walls 57 and a radially outer end wall 58. Each transverse wall 57 has an opening 59. The compartments also have an upper axially facing wall 62 which has a vent 63 formed therein. The lower axially facing side of each compartment is left open. The brush gear 60, as illustrated, comprises two brush assemblies which include a carbon based brush 65 arranged to make sliding contact with the commutator and a brush guidance mechanism for guiding the movement of the brush and including a spring for resiliently urging the brush towards the commutator.

The brush guidance mechanism is preferably a rail guidance mechanism or rail arrangement in which rails are received in respective grooves in the brush to restrict the brush to move only along a predetermined path. Preferably there are two rails which are respective ends of a bent rod which is fixed to the holder 54 by a brush card.

Figure 5:
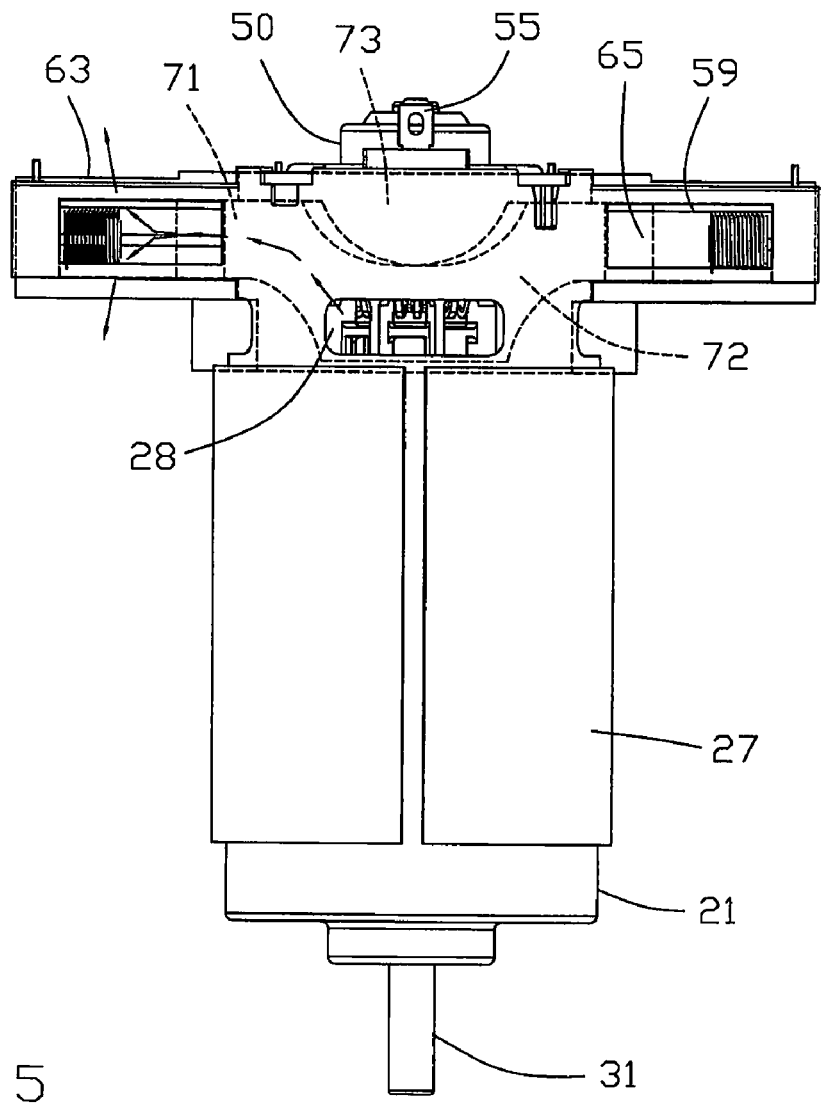
FIG. 5 is a side view of the motor of FIG. 1 with a part of the air guide shown in phantom.

The air guide 70 is shown being formed in two identical parts, covers 71. Each cover is arranged to fit closely against the end cap and to cover one of the outlets 28 and one opening 59 in each of the two compartments 56. This is shown more clearly in FIG. 5 where the facing cover 71 is shown in phantom to reveal how the covers connect the outlet 28 to the openings 59. The covers 71 have a recess which forms an air passage 72 connecting the outlet 28 with the openings 59. The recess is shaped such that the air flow leaving the outlet 28 is divided between the two openings 59. Mass 73 helps to divide the air flow.

In use, when the motor is operating, the fan draws air into the motor housing and end cap through the inlets 26, 53. The air from inlets 26 is drawn over and through the rotor core 32 to cool the rotor. The air from inlets 53 is drawn over the commutator to cool the commutator 33. The air is then discharged through outlets 28, 29. The air discharged through outlets 28 pass through the air passage in the air guide and enter the compartments 56 through the openings 59 in the transverse walls 57. This air flow impinges on the brushes inside the compartments to cool the brushes and then leaves the compartment through vents 63 in the upper wall 62 or through the open face. Air exiting through outlet 29 may impinge on the brushes through the open face or simply form a draft to encourage greater air flow through the compartments and thus greater cooling of the brushes.

As an additional benefit, the increased air flow across the brushes may help to remove carbon dust, formed by the wearing of the brushes on the commutator, away from the motor to avoid build up of the dust which may otherwise occur and which may lead to motor failure if it becomes excessive.

Although the invention has been described with reference to one or more preferred embodiments, it should be appreciated by those skilled in the art that various modifications are possible. Therefore, the scope of the invention is to be determined by reference to the claims that follow.

For example, the number of the brushes 31 is not limited to two, and may be three, four etc. Accordingly, the end cap 20 may comprise three, four or more cages 25. Also, the air guide could be formed in any number of parts, including a single piece or even formed integrally with the end cap.

In the description and claims of the present application, each of the verbs "comprise", "include", "contain" and "have", and variations thereof, are used in an inclusive sense, to specify the presence of the stated item but not to exclude the presence of additional items.

The invention claimed is:

1. An electric motor comprising:
a stator comprising a housing with inlets and outlets;
a rotor rotatably installed in the housing of the stator, the rotor comprising a shaft, a rotor core fitted to the shaft, and a commutator fitted to the shaft adjacent the rotor core;
a fan fixed to the rotor for rotation there with;
an end cap fitted to the housing and closing a first end of the housing and supporting electrical components;
brush gear, supported by the end cap, comprising at least two brush assemblies, each brush assembly comprising a brush for making sliding electrical contact with the commutator and a brush guidance mechanism for resiliently urging the brush into contact with the commutator; and
an air guide;
wherein the end cap has compartments accommodating the brush assemblies, each compartment having vents on an axially facing side thereof and openings in a transverse wall thereof and the air guide guides a part of the airflow generated by the fan exiting from said one of the outlets of the housing to flow into the compartments via the openings and exit the compartments via the vents to cool the brushes therein.

2. The electric motor of claim 1, wherein the housing has a closed end and at least one of the inlets are formed in the closed end of the housing and the fan draws air in through said at least one inlet and over the rotor core.

3. The electric motor of claim 1, wherein the end cap has two compartments, each accommodating a single brush assembly and the air guide comprises a pair of covers fitted to a radially outer surface of the end cap.

4. The motor of claim 3, wherein each compartment has two transverse walls with an opening therein and each cover extends over one opening of each compartment and one of the outlets of the housing.

5. The motor of claim 4, wherein each cover forms an air passage between the one outlet and the two openings and air flow through the one outlet is divided between the two openings.

6. The motor of claim 3, wherein each compartment extends radially through and beyond a wall of the housing and has an axially open face which is disposed adjacent a second one of the outlets, said second one of the outlets being uncovered by the air guide and air exhausting from said second one of the outlets being free to impinge on the brush assembly within the adjacent compartment.

7. The motor of claim 1, wherein the housing has slots formed in the open end and joining with the second outlets for receiving the compartments of the end cap.

* * * * *